Sept. 4, 1962
G. P. KATONA
3,052,811
ELECTROLUMINESCENT CELL
Filed Sept. 11, 1959
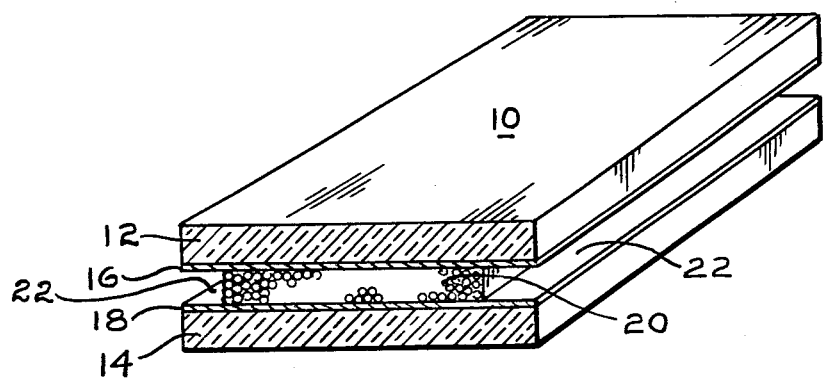
INVENTOR.
GABRIEL P. KATONA
BY Clarence R. Patty. Jr.
ATTORNEY

United States Patent Office 3,052,811
Patented Sept. 4, 1962

3,052,811
ELECTROLUMINESCENT CELL
Gabriel P. Katona, Corning, N.Y., assignor to Corning Glass Works, Corning, N.Y., a corporation of New York
Filed Sept. 11, 1959, Ser. No. 839,499
10 Claims. (Cl. 313—108)

This invention relates to electroluminescent cells and more particularly to a thin flexible cell having a high impact resistance and a greater degree of flexibility than heretofore possible.

It is well known in the art, that electroluminescent light may be generated by placing a suitable phosphor in an electric field. This electric field, the intensity of which is determined by the thickness of the phosphor layer and the applied voltage, excites the phosphor by a movement of the electric charges within the phosphor particle to produce a usable light.

In the usual case, the phosphor is excited by reason of being placed between two area electrodes to which a voltage has been applied.

To date, the most usual form of electroluminescent cell comprises at least one glass surface having a conductive coating thereon, a layer of electroluminescent material deposited over the conductive coating and a second conductive coating usually deposited directly on the exposed phosphor layer. To complete the device, the cell is then either placed in a container to prevent the user from getting a shock from either or both electrodes or in the alternative, the back electrode is covered with a thick insulating material to prevent shock and deterioration of the conducting layer and to protect the cell. In neither case is the cell flexible which in certain instances would be a very desirable feature.

The present state of the flexible electroluminescent panel art is exemplified by the patent to Mary S. Jaffe, Patent No. 2,774,004, issued December 11, 1956. This reference teaches the use of glass cloth that has been rendered conductive and a layer of phosphor material sandwiched between the cloth and another conducting surface. Here too, to overcome the difficulties of humidity attack on the conductive surfaces, and also to minimize the danger of shock hazard, the Jaffe reference teaches the use of a plastic material to cover the exposed conductive sides. In another embodiment, the Jaffe reference teaches substituting a conductive coating on a more solid and rigid surface such as glass or plastic but here too, must resort to an auxiliary flexible coating to cover the exposed conductive glass cloth surface.

I have found that if very thin sheets of glass are used as the backing material or the substrate between which the phosphor layer is sandwiched, a flexible yet extremely thin and strong electroluminescent cell will be formed that will be characterized by its appreciable impact strength due to its laminated structure.

As hereinafter referred to, the term "microsheet" shall denote an extremely thin and flexible glass sheet which is less than about .025 inch thick.

When using my thin microsheet backing for an electroluminescent cell, I have found that I have imparted thereto a good degree of flexibility with an appreciable degree of impact resistance while at the same time providing a means of automatically insulating the conductive coatings from shock hazard without the need for the additional coatings required by the prior art.

It is, therefore an important object of the present invention to provide a thin electroluminescent cell having an appreciable degree of impact resistance.

It is another object of this invention to provide a thin electroluminescent cell having an appreciable degree of impact resistance yet noted by its flexibility.

Still another object of the present invention is to provide a means of insulating the conductive layers of such a cell without having to resort to an additional insulating layer or layers.

Other objects, features and many advantages will become apparent to those skilled in the art as my invention becomes better understood, by reference to the following detailed description, when considered in connection with the accompanying drawing which forms a part of this application.

The single FIGURE of the drawing is a perspective view embodying the principles of my invention and, for the sake of clarity, the elements therein have been somewhat exaggerated.

Numeral 10 indicates the complete electroluminescent panel. Microsheets 12 and 14, which act as the backing material or substrate, are coated with conductive material 16 and 18 respectively. Sandwiched between conductive coatings 16 and 18 is the phosphor layer 20 having any of the well known and appropriate transparent embedding dielectric materials contained therein.

The phosphor 20 may be any of the many materials which will emit light when placed under the influence of an electric field and may be, for example, any of the appropriate phosphors set forth in the article entitled "The New Phenomenon of Electro-Photoluminescence and Its Possibilities for the Investigation of Crystal Lattice," G. Destriau, Philosophical Magazine and Journal of Science, vol. 38, pages 700–739, 774–793 and 880–888.

Conductive coatings 16 and 18 may be, for example, the type set forth by J. M. Mochel in his Patent No. 2,564,708, issued August 21, 1951, and assigned to the assignee of the instant application.

By providing, for example, the construction shown in the drawing, namely wherein the microsheet overlaps the outer edges of phosphor or electric field responsive light emitting material 20, the applicant is able to provide further functions which are not possible in the prior art devices. The overhung channel area indicated at 22 is bounded by that portion of conducting layers 16 and 18 which overhangs the field responsive light emitting material 20. When the exposed channels 22 on all sides of the panel are filled with a potting or sealing material, applicant is able to provide a completely watertight electroluminescent panel. By way of example, the potting material may be the same dielectric used previously as the phosphor embedding agent. Thus, applicant has shown an electroluminescent device that is noted by its light weight, flexibility and high impact resistance yet is impervious to the effects of temperature and excessive humidity.

While I have described what is presently considered a preferred embodiment of my invention, it will be obvious to those skilled in the art that various changes and modifications may be made therein without departing from the inventive concept contained therein and, it is therefore aimed in the appended claims to cover all such changes and modifications that fall within the true spirit and scope of my invention.

It will now become apparent that an appreciable reduction in the overall weight and thickness of the cell may be accomplished without seriously affecting its flexibility or impact resistance if either substrate 12 or 14 were made thinner than the other. While it is preferred to have the transparent substrate thinner, to improve light transmission therethrough, it is not necessarily so limited.

What is claimed is:

1. In an electroluminescent panel of the type consisting of a dielectric substrate having a transparent electrically conductive film adhered to one side thereof, a layer of electric field responsive light emitting material deposited on said film, and an electrically conductive layer in contact with the exposed side of said light emitting material, the improvement comprising forming said substrate of sheet glass less than about 0.025 inch thick to render said panel lightweight and flexible.

2. In an electroluminescent panel of the type consisting of a pair of dielectric substrates each having a film of electrically conductive coating on one side thereof, a layer of electric field responsive light emitting material embedded in a solid dielectric laminated between and in contact with each of said electrically conductive films, the improvement comprising forming said dielectric substrates of sheet glass less than about 0.025 inch thick to render said panel lightweight and flexible.

3. The device of claim 2 wherein at least one of said electrically conducting films is transparent.

4. The device of claim 2 wherein one of said substrates is thinner than the other.

5. The device of claim 4 wherein said thinner substrate is transparent.

6. The device of claim 2 wherein the area occupied by said layer of embedded light emitting material is substantially smaller than the area of said films to define a channel bounded by said film surfaces and the outer edge of said layer.

7. The device of claim 6 wherein at least one of said electrically conductive films is transparent.

8. The device of claim 6 wherein said channel is filled with a dielectric potting material to render said panel watertight and impervious to the effects of excessive humidity.

9. The device of claim 8 wherein one of said substrates is thinner than the other.

10. The device of claim 9 wherein said thinner substrate is transparent.

References Cited in the file of this patent

UNITED STATES PATENTS 2,857,541  Etzel _____ Oct. 21, 1958

FOREIGN PATENTS 787,401  Great Britain _____ Dec. 11, 1957